(12) United States Patent
Kang et al.

(10) Patent No.: US 9,203,246 B2
(45) Date of Patent: Dec. 1, 2015

(54) BALANCING CONTROL CIRCUIT FOR BATTERY CELL MODULE USING LC SERIES RESONANT CIRCUIT

(71) Applicant: POSTECH ACADEMY-INDUSTRY FOUNDATION, Pohang-si, Gyeongsangbuk-do (KR)

(72) Inventors: Bong Koo Kang, Pohang-si (KR); Chang Hyeon Sung, Daegu-si (KR); Hyung Jin Choe, Yongin-si (KR); Ho Young Yoon, Ansan-si (KR); Min Gi Cho, Seoul (KR); Yoo Chae Chung, Pohang-si (KR); Kyung Min Lee, Daejeon-si (KR)

(73) Assignee: POSTECH ACADEMY-INDUSTRY FOUNDATION, Pohang-Si, Gyeongsangbuk-Do (KR)

( * ) Notice: Subject to any disclaimer, the term of this patent is extended or adjusted under 35 U.S.C. 154(b) by 188 days.

(21) Appl. No.: 14/065,292

(22) Filed: Oct. 28, 2013

(65) Prior Publication Data

US 2014/0340022 A1    Nov. 20, 2014

(30) Foreign Application Priority Data

May 16, 2013   (KR) .................. 10-2013-0055639
May 16, 2013   (KR) .................. 10-2013-0055656

(51) Int. Cl.
    *H01M 10/46*    (2006.01)
    *H02J 7/00*     (2006.01)
    *H02J 7/34*     (2006.01)

(52) U.S. Cl.
    CPC ............ *H02J 7/0014* (2013.01); *H02J 7/0019* (2013.01); *H02J 7/345* (2013.01); *Y02T 10/7055* (2013.01)

(58) Field of Classification Search
    CPC ..... H02J 7/0013; H02J 7/0014; H02J 7/0016; H02J 7/0018; H02J 7/0019
    USPC ................ 320/103, 107, 116, 118, 119, 166
    See application file for complete search history.

(56) References Cited

U.S. PATENT DOCUMENTS

| 2005/0029987 | A1* | 2/2005 | Lin ....................... | H02J 7/0016 320/119 |
| 2012/0007558 | A1* | 1/2012 | Pigott .................. | H02J 7/0018 320/118 |
| 2013/0093395 | A1* | 4/2013 | Liu ...................... | H02J 7/0019 320/118 |

FOREIGN PATENT DOCUMENTS

| JP | 2001-178008  | 6/2001  |
| JP | 2011-223722  | 11/2011 |
| JP | 2012-34446   | 2/2012  |
| JP | 2013-013291  | 1/2013  |
| WO | 2010/079061  | 7/2010  |

* cited by examiner

*Primary Examiner* — Edward Tso
(74) *Attorney, Agent, or Firm* — Kile Park Reed & Houtteman PLLC

(57) ABSTRACT

Provided is a battery cell balancing circuit including: a battery cell module including a plurality of battery cells connected in series; a series resonant circuit including an inductor unit and a capacitor unit which are connected in series so as to store electric energy recovered from a corresponding battery cell of the battery cell module and supply the stored electric energy to a corresponding battery cell of the battery cell module; and a switch unit configured to provide an electric energy recovery path for storing the electric energy recovered from the corresponding battery cell of the battery cell module into the capacitor unit of the series resonant circuit and provide an electric energy supply path for supplying the stored electric energy to the corresponding battery cell of the battery cell module.

18 Claims, 17 Drawing Sheets

(a)

(b)

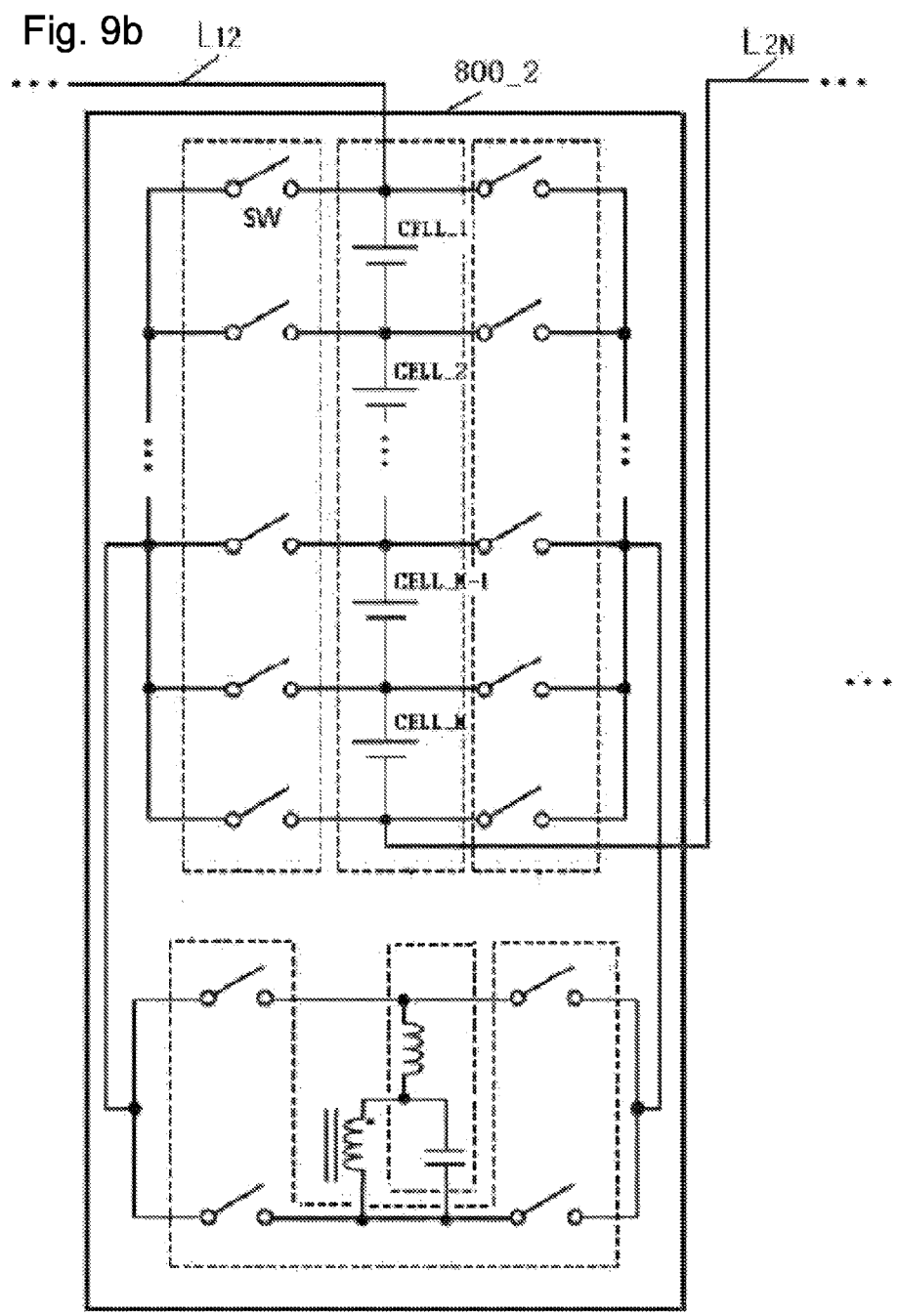

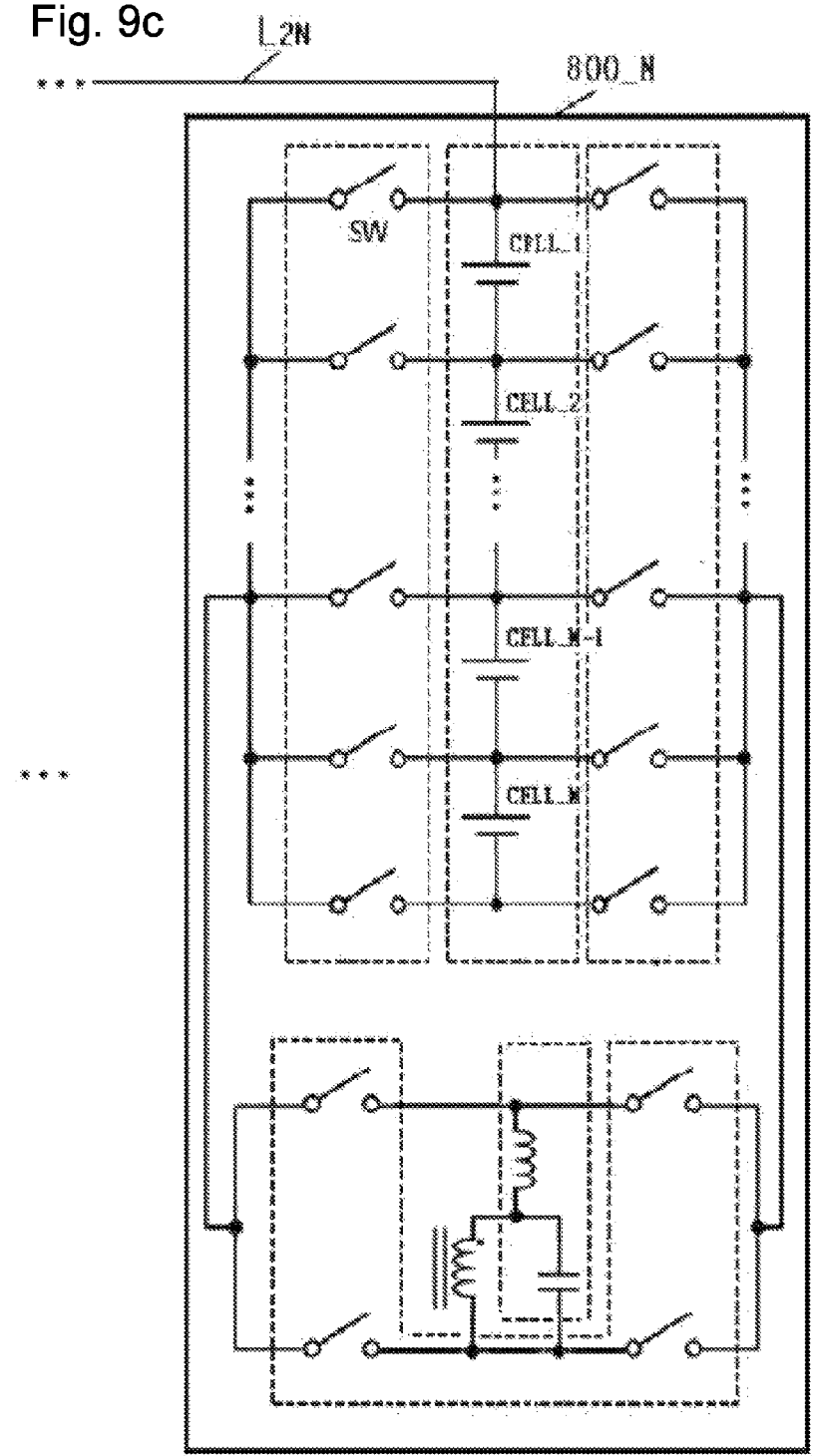

BALANCING CONTROL CIRCUIT FOR BATTERY CELL MODULE USING LC SERIES RESONANT CIRCUIT

BACKGROUND OF THE INVENTION

1. Field of the Invention

The present invention relates to a balancing control technology for battery cells, and more particularly, to a balancing control circuit for a battery cell module using an LC series resonant circuit, which is capable of performing a balancing operation for a battery cell module using switching elements and an LC series resonant circuit.

2. Description of the Related Art

In general, when a voltage applied across a battery (battery cell) exceeds a predetermined value, the battery may explode, and when the voltage drops below a predetermined value, the battery may receive permanent damage. When power is intended to be supplied to a device requiring a relatively large amount of power, such as an electric vehicle, through a battery cell, a battery cell module (battery pack) including battery cells connected in series is used. However, when the battery cell module is used, a voltage imbalance may occur due to a difference in performance between the respective battery cells.

When the battery cell module is charged, one battery cell within the battery cell module may reach an upper-limit voltage before the other battery cells. In this case, the battery cell module cannot be charged any more. Thus, the charging must be ended in a state where the other battery cells are not sufficiently charged. As a result, the charge capacity of the battery cell module does not approach the rated charge capacity.

Furthermore, when the battery cell module is discharged, one battery cell within the battery cell may reach a lower-limit voltage before the other battery cells. In this case, since the battery cell module cannot be used any more, the duration of use of the battery cell module is reduced as much.

When the battery cell module is charged or discharged as described above, the electric energy of a battery cell having higher electric energy may be supplied to a battery cell having lower electric energy, in order to expand the duration of use of the battery cell module. Such an operation is referred to as battery balancing.

FIG. 1 is a circuit diagram of a conventional battery cell balancing circuit using parallel resistors. Referring to FIG. 1, the conventional battery cell balancing circuit includes a battery cell module 11 having battery cells CELL1 to CELL4 connected in series, resistors R11 to R14 connected in series, and switches SW11 to SW15 configured to selectively connect both end terminals of the battery cell module 11 and connection terminals between the battery cells CELL1 to CELL4 to corresponding terminals of the resistors R11 to R14, respectively.

Referring to FIG. 1, when the charge voltage of an arbitrary battery cell among the battery cells CELL1 to CELL4 within the battery cell module 11 reaches an upper-limit voltage before the charge voltages of the other battery cells during a charging operation for the battery cell module 1, a corresponding switch among the switches SW11 to SW15 is turned on to discharge the charge voltage through a corresponding resistor among the resistors R11 to R14.

For example, when the charge voltage of the second battery cell CELL2 reaches the upper-limit voltage before the charge voltages of the other battery cells CELL1, CELL3, and CELL4, the switch SW12 is turned on for a required time. Thus, while the charge voltage of the battery cell CELL12 is discharged through the resistor R12 as needed, battery cell balancing is performed.

However, when such a battery cell balancing circuit is used, power is consumed through the resistors. Thus, the efficiency is reduced as much. Furthermore, since the upper-limit voltage cannot be supplied to a battery cell having a lower voltage while the battery module is used, the efficiency is reduced.

FIG. 2 is a circuit diagram of a conventional battery cell balancing circuit using capacitors. Referring to FIG. 2, the conventional battery cell balancing circuit includes a battery cell module 21 having battery cells CELL1 to CELL4 connected in series, capacitors C21 to C23 connected in series, and switches SW21 to SW24 configured to selectively connect each of one terminal of the capacitor C21, a connection terminal between the capacitors C21 and C22, a connection terminal between the capacitors C22 and C23, and the other terminal of the capacitor C23 to one of both terminals of a corresponding battery cell among the battery cells CELL1 to CELL4.

Referring to FIG. 2, the battery cell balancing circuit using capacitors has two connection states. In the first connection state, each of one terminal of the capacitor C21, the connection terminal between the capacitors C21 and C22, the connection terminal between the capacitors C22 and C23, and the other terminal of the capacitor C23 is connected to one terminal (anode) of a corresponding battery cell among the battery cells CELL1 to CELL4, as illustrated in FIG. 2. In the second connection state, each of the one terminal of the capacitor C2, the connection terminal between the capacitors C21 and C22, the connection terminal between the capacitors C22 and C23, and the other terminal of the capacitor C23 is connected to the other terminal (cathode) of the corresponding battery cell among the battery cells CELL1 to CELL4.

However, such a battery cell balancing circuit has a problem in that the efficiency thereof decreases because a hard switching operation occurs between a capacitor and a battery cell. Desirably, the battery cells within the battery module may have the same capacity. However, due to various reasons, the battery cells have different capacities therebetween. In this case, although the charge voltage of an arbitrary battery cell is lower than the charge voltages of the other battery cells, the arbitrary battery cell may have a larger capacity. At this time, the voltage of a battery cell having a lower voltage needs to be transmitted to a battery cell having a higher voltage. However, the conventional battery cell balancing circuit cannot perform the voltage transmission function.

FIG. 3 is a circuit diagram of a conventional battery cell balancing circuit using a flyback structure. Referring to FIG. 3, the battery cell balancing circuit includes a battery cell module 31 having battery cells CELL1 to CELL4 connected in series, a flyback converter 32, switches CELL1 to CELL4 configured to selectively connect a plurality of secondary coils of the flyback converter 32 to both terminals of the battery cells CELL1 to CELL4, respectively, and a switch SW35 configured to selectively connect one side of a primary coil of the flyback converter 32 to one side of the battery cell module 31.

The battery cell balancing circuit of FIG. 3 is a battery cell balancing circuit using a flyback structure, which is one of switch mode power supplies (SMPS). The battery cell balancing circuit may transmit electric energy to the battery cells CELL1 to CELL4 connected in series within the battery cell module 31 using the switches SW31 to SW34, respectively, and may transmit electric energy between both end terminals of the battery cell module 31.

Since the battery cell balancing circuit has the shape of an SMPS, the battery cell balancing circuit has excellent efficiency. However, with the increase in number of battery cells provided in the battery cell module, the size of a magnetic core used in the flyback converter is inevitably increased. Thus, the price of the battery cell balancing circuit increases.

Furthermore, since the conventional battery cell balancing circuit does not have a function of properly controlling balancing speed, there are difficulties in improving the balancing efficiency or securing the cell stability.

SUMMARY OF THE INVENTION

Accordingly, the present invention has been made in an effort to solve the problems occurring in the related art, and an object of the present invention is to provide a balancing control circuit for a battery cell module, which performs a balancing operation on a battery cell module using switching elements and an LC series resonant circuit, thereby minimizing a loss caused by hard switching.

Another object of the present invention is to provide a balancing control circuit for a battery cell module using an LC series resonant circuit, which varies electric energies of capacitors of a plurality of battery cell modules provided in a plurality of battery modules at the same level using transforms, when the battery cell modules are connected in series.

In order to achieve the above object, according to one aspect of the present invention, there is provided a battery cell balancing circuit including: a battery cell module including a plurality of battery cells connected in series; a series resonant circuit including an inductor unit and a capacitor unit which are connected in series so as to store electric energy recovered from a corresponding battery cell of the battery cell module and supply the stored electric energy to a corresponding battery cell of the battery cell module; and a switch unit configured to provide an electric energy recovery path for storing the electric energy recovered from the corresponding battery cell of the battery cell module into the capacitor unit of the series resonant circuit and provide an electric energy supply path for supplying the stored electric energy to the corresponding battery cell of the battery cell module.

According to another aspect of the present invention, there is provided a battery cell balancing circuit using an LC series resonant circuit, including a plurality of battery modules. Each of the battery modules includes: a battery cell module including a plurality of battery cells connected in series; a series resonant circuit configured to store electric energy recovered from a corresponding battery cell of the battery cell module and supply the stored electric energy to a corresponding battery cell of the battery cell module; a switch unit configured to provide an electric energy recovery path for storing the electric energy recovered from the corresponding battery cell of the battery cell module into a capacitor of the series resonant circuit and provide an electric energy supply path for supplying the stored electric energy to a corresponding battery cell of the battery cell module; and a coil of a transformer connected in parallel to the capacitor, the battery cell modules are connected in series, and the coils included in the series resonant circuits are magnetically coupled so that the levels of electric energies stored in or discharged from the capacitors are varied at the same level.

BRIEF DESCRIPTION OF THE DRAWINGS

The above objects, and other features and advantages of the present invention will become more apparent after a reading of the following detailed description taken in conjunction with the drawings, in which:

FIGS. 9A to 9C are detailed circuit diagrams of battery modules of FIG. 8;

DETAILED DESCRIPTION OF PREFERRED EMBODIMENTS

Figure 1:
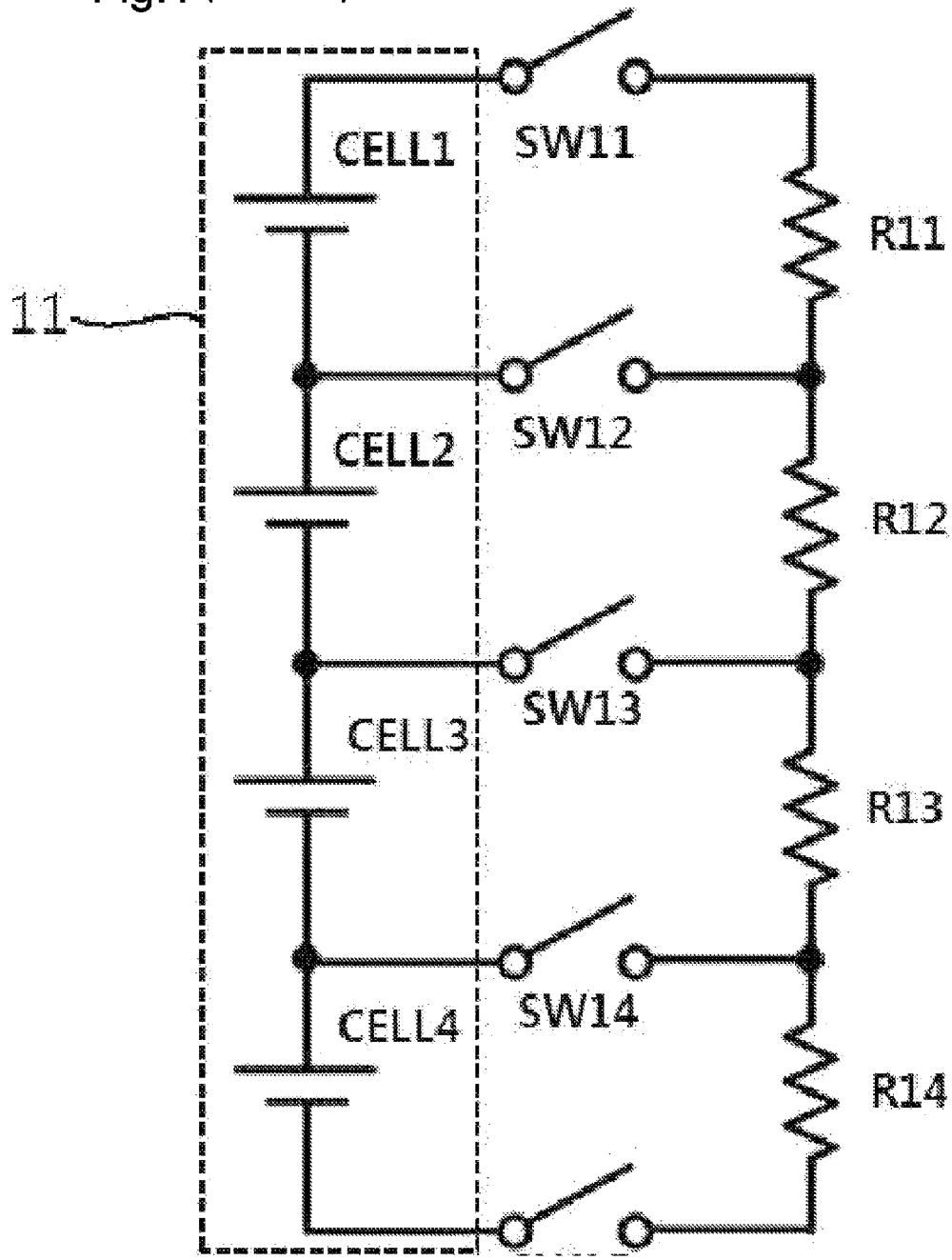
FIG. 1 is a circuit diagram of a conventional battery cell balancing circuit using parallel resistors.
Figure 2:
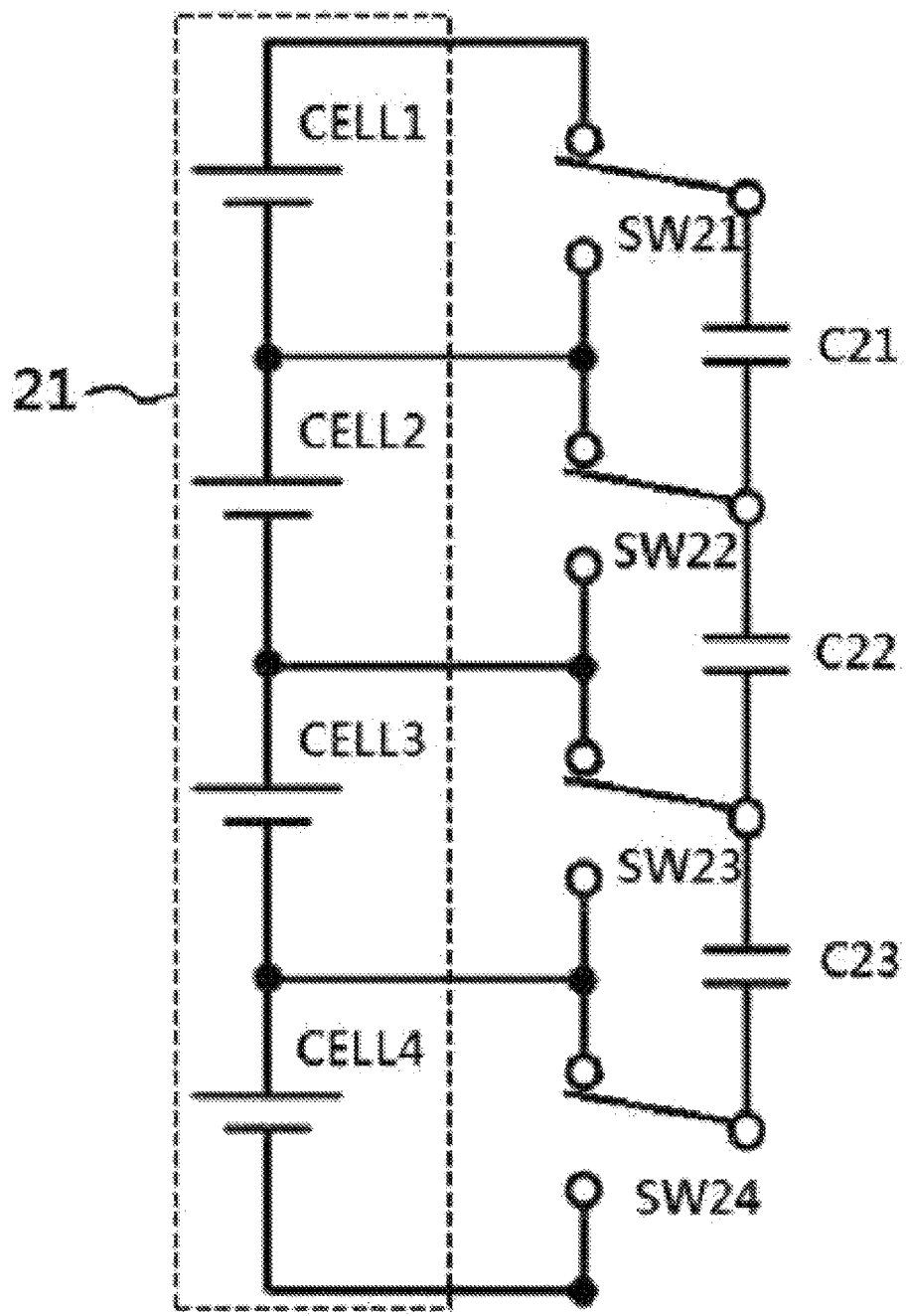
FIG. 2 is a circuit diagram of a conventional battery cell balancing circuit using capacitors.
Figure 3:
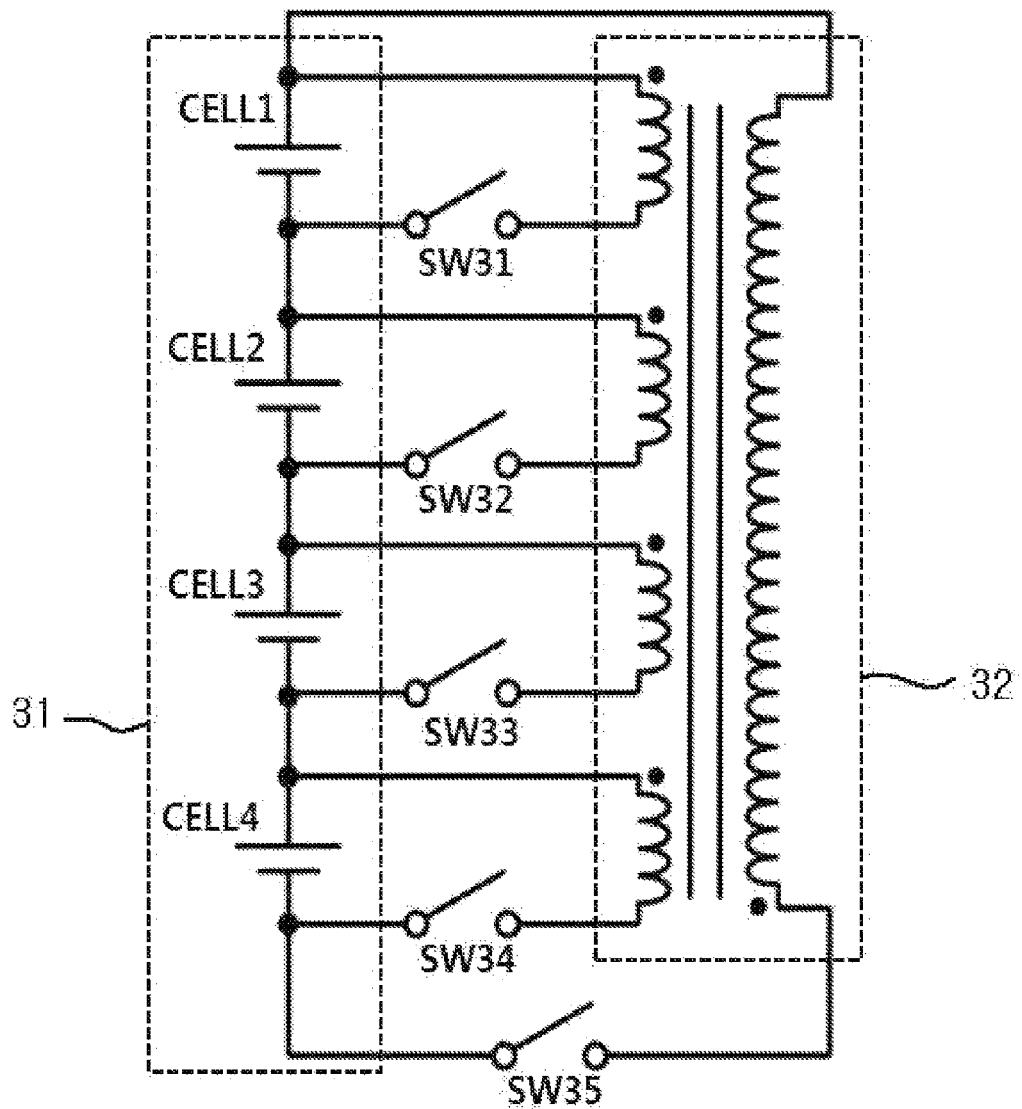
FIG. 3 is a circuit diagram of a conventional battery cell balancing circuit using a flyback structure.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 4:
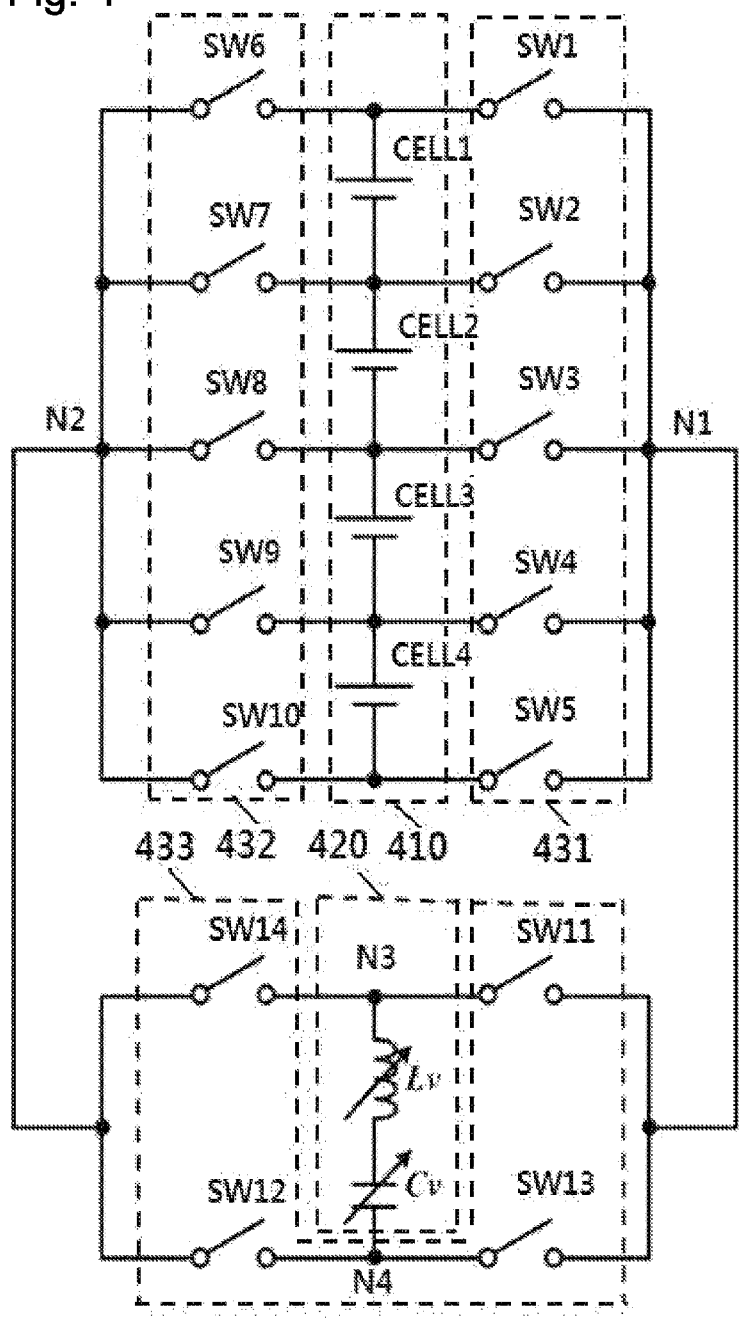
FIG. 4 is a diagram illustrating a balancing control circuit for a battery cell module using an LC series resonant circuit according to an embodiment of the present invention.

FIG. 4 is a diagram illustrating a balancing control circuit for a battery cell module using an LC series resonant circuit according to an embodiment of the present invention. Referring to FIG. 4, the balancing control circuit includes a battery cell module 410, a series resonant circuit 420, and a switch unit having first to third switch units 431 to 433.

The battery cell module 410 includes first to fourth battery cells CELL1 to CELL4 connected in series.

The series resonant circuit 420 includes an inductor unit Lv and a capacitor unit Cv which are connected in series. The inductor unit Lv may have a variable capacity, and the capacitor unit Cv may have a variable capacity.

The switch unit (not illustrated) includes the first to third switch units 431 to 433.

The first switch unit 431 is configured to form a path for recovering or supplying electric energy from or to the first to fourth battery cells CELL1 to CELL4. For this operation, the first switch unit 431 includes first to fifth switches SW1 to SW5 of which one terminals are connected to the respective terminals of the first to fourth battery cells CELL1 to CELL4 and the other terminals are commonly connected to a first common node N1.

The second switch unit 432 is configured to form a path for recovering or supplying electric energy from or to the first to fourth battery cells CELL1 to CELL4. For this operation, the second switch unit 432 includes sixth to tenth switches SW6 to SW10 of which one terminals are connected to the respective terminals of the first to fourth battery cells CELL1 to CELL4 and the other terminals are commonly connected to a second common node N2.

The respective terminals of the first to fourth battery cells CELL1 to CELL4 include one terminal of the first battery cell CELL1, a common connection terminal between the other terminal of the first battery cell CELL1 and one terminal of the second battery cell CELL2, a common connection terminal between the other terminal of the second battery cell CELL2 and one terminal of the third battery cell CELL3, a common connection terminal between the other terminal of the third battery cell CELL3 and one terminal of the fourth battery cell CELL4, and the other terminal of the fourth battery cell CELL4.

The third switch unit 433 includes 11th to 14th switches SW11 to SW14. The 11th switch SW11 is configured to connect one end terminal of the series resonant circuit 420 to the first common node N1, and the 12th switch SW12 is configured to connect the other end terminal of the series resonant circuit 420 to the second common node N2, in an electric energy recovery mode. The 13th switch SW13 is configured to connect the other end terminal of the series resonant circuit 420 to the first common node N1, and the 14th switch SW14 is configured to connect the one end terminal of the series resonant circuit 420 to the second common node N2, in an electric energy supply mode.

SPST (single pole single throw) switches may be used as the switches provided in the first to third switch units 431 to 433. However, the present invention is not limited thereto, and the first to third switch units 431 to 433 may be implemented with other switching elements such as MOSFET (metal oxide field effect transistor), BJT (bipolar junction transistor), and IGBT (insulated gate bipolar transistor).

In the electric energy recovery mode, when one battery cell among the first to fourth battery cells CELL1 to CELL4 of the battery cell module 410 is charged with higher electric energy than the other battery cells, the electric energy of the battery cell is temporarily stored into the series resonant circuit through the electric energy recovery path formed by the switches of the first to third switch units 431 to 433. At this time, since the capacity of the battery cell charged with higher electric energy is much larger than the capacity of the variable capacitor unit Cv, the voltage of the battery cell slightly decreases. On the other hand, the charge voltage of the variable capacitor unit Cv increases in the form of a sine function.

Then, in the electric energy supply mode, the electric energy temporarily stored in the variable capacitor unit Cv of the series resonant circuit 420 is supplied to a battery cell charged with lower electric energy than the other battery cells among the first to fourth battery cells CELL1 to CELL4 through the electric energy recovery path formed through the switches of the first to third switch units 431 to 433.

Through the above-described series of electric energy recovery and supply processes, battery cell balancing is performed.

In the present embodiment, however, the series resonant circuit 420 includes the inductor unit Lv and the capacitor unit Cv having a variable capacity, in order to control the balancing speed when a balancing operation is performed on the first to fourth battery cells CELL1 to CELL4 of the battery cell module 410.

Figure 5:
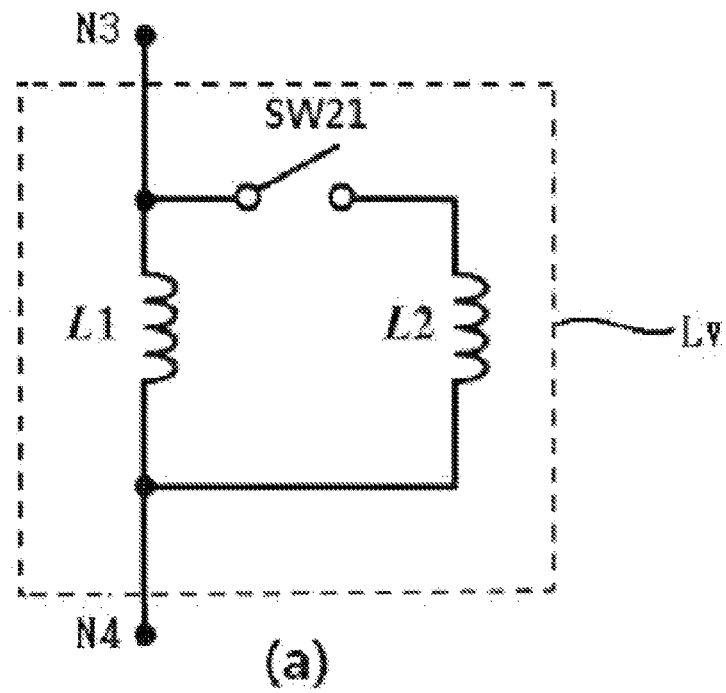
FIG. 5A is a circuit diagram of a variable inductor according to the embodiment of the present invention.
FIG. 5B is a circuit diagram of a variable capacitor according to the embodiment of the present invention.
Figure 5:
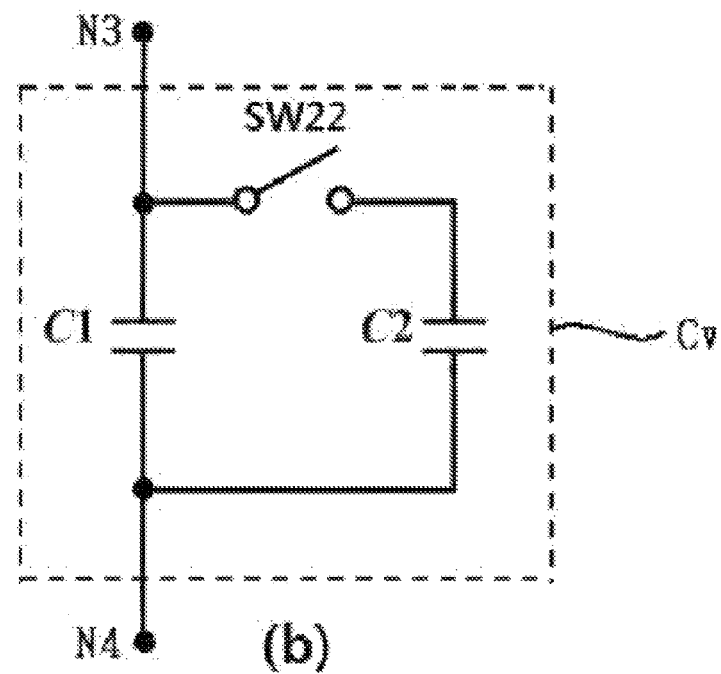

The method for implementing the inductor unit Lv and the capacitor unit Cv to have a variable capacity may include various embodiments. FIGS. 5A and 5B illustrate the embodiments.

FIG. 5A illustrates an example in which the inductor unit Lv is implemented with two inductors L1 and L2 and a 21st switch SW21. When the 21st switch SW21 is turned on, the two inductors L1 and L2 are connected in parallel to each other through the 21st switch SW21, and the inductance of the inductor unit Lv is adjusted (decreased). However, when the 21st switch SW21 is turned off, the value of the variable inductor unit Lv is set by the one inductor L1. Thus, the inductor unit Lv has higher inductance than when the two inductors L1 and L2 are connected in parallel to each other.

FIG. 5B illustrates an example in which the capacitor unit Cv is implemented with two capacitors C1 and C2 and a 22nd switch SW22. When the 22nd switch SW22 is turned on, the two capacitors C1 and C2 are connected in parallel to each other through the 22nd switch SW22, and the capacitance of the capacitor unit Cv is adjusted (increased). However, when the 22nd switch SW22 is turned off, the value of the variable capacitor unit Cv is set by the one capacitor C1. Thus, the capacitor unit Cv has lower capacitance than when the two capacitors C1 and C2 are connected in parallel to each other.

Figure 6:
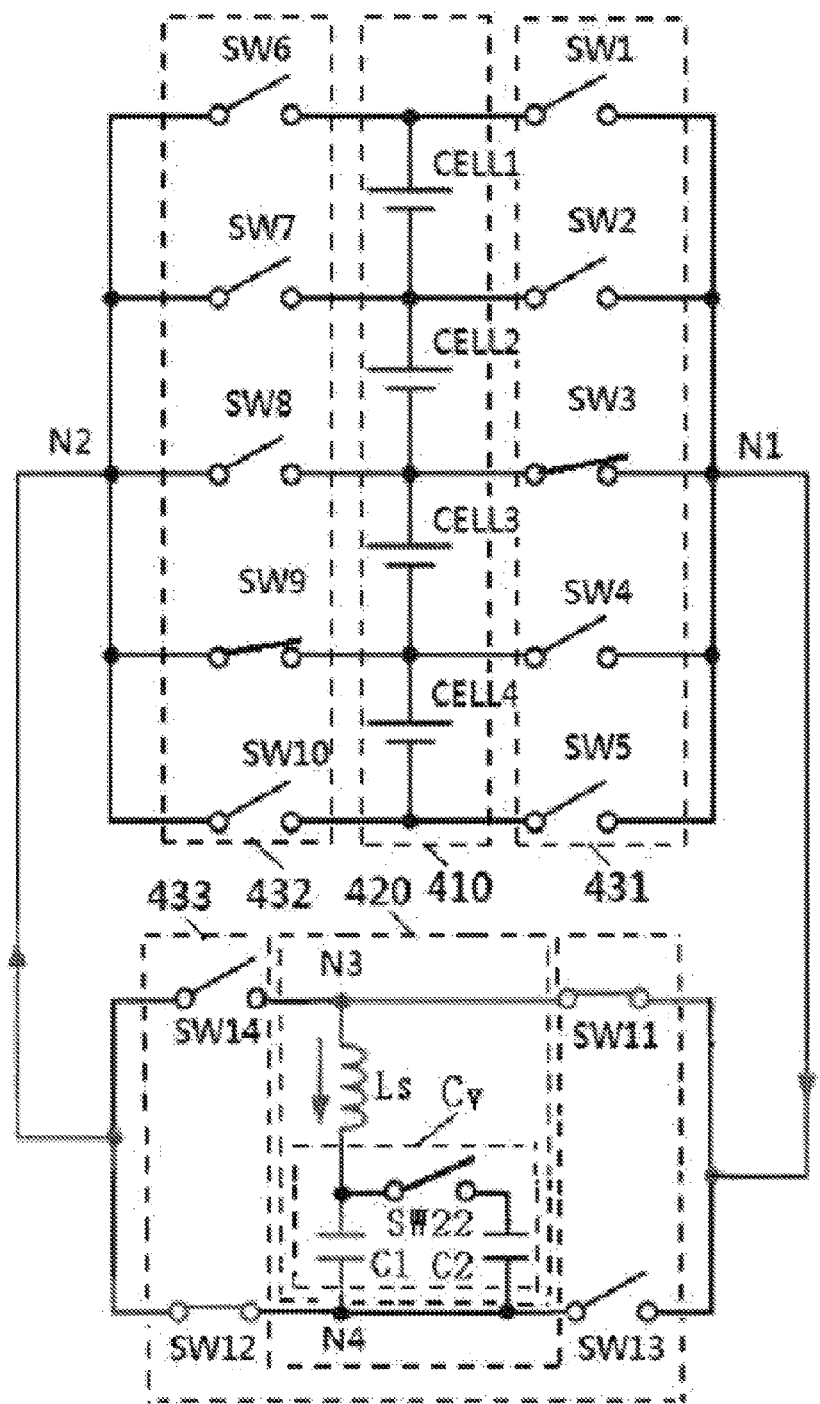
FIGS. 6 and 7 are circuit diagrams illustrating examples in which a variable capacitor is used to adjust balancing speed.
Figure 7:
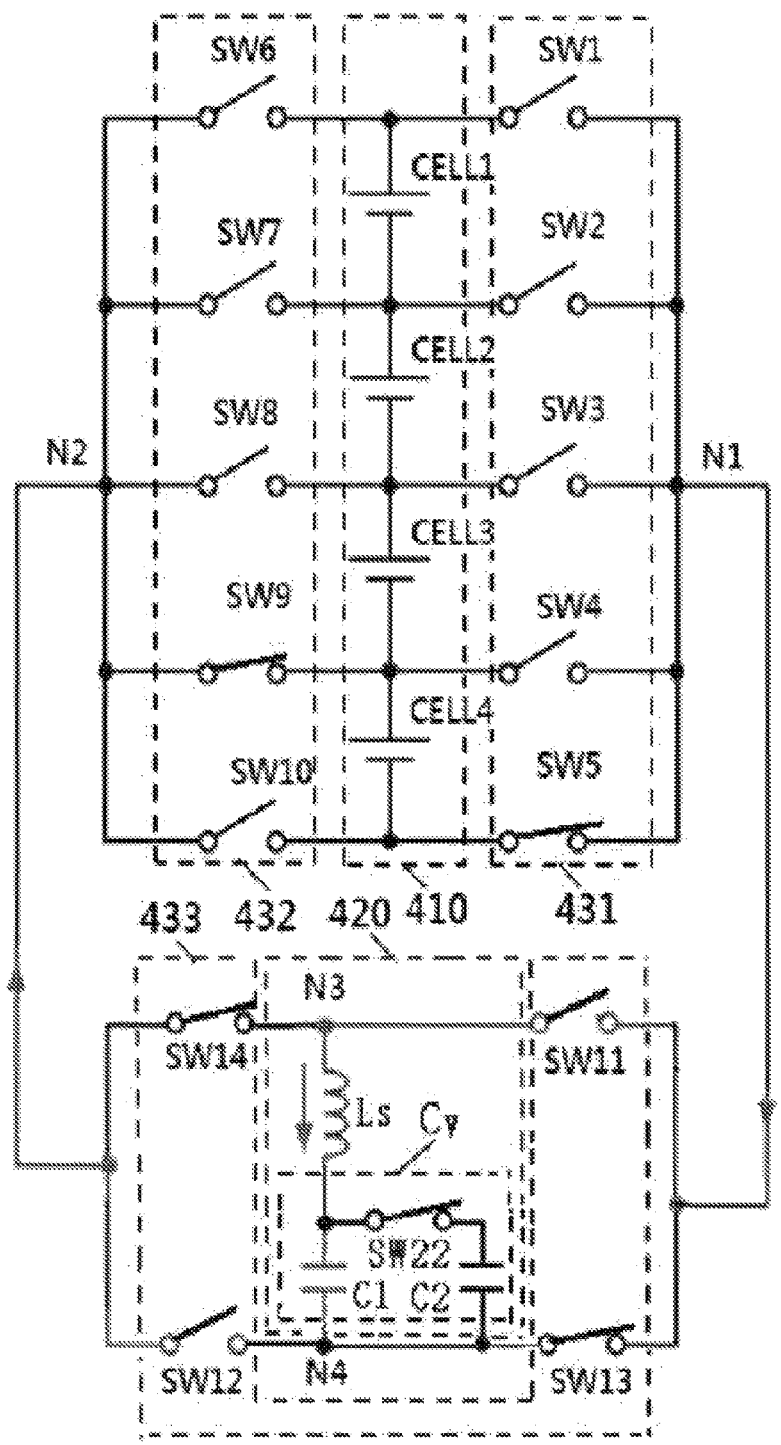

FIGS. 6 and 7 illustrate an example in which the inductor unit of the series resonant circuit 420 is implemented with a fixed inductor $L_s$ having a fixed inductance value and the capacitor unit Cv is implemented with a variable capacitor of which the capacity is varied by the two capacitors C1 and C2 according to a required balancing speed. Referring to FIGS. 6 and 7, a process of controlling the balancing speed by varying the capacity of the capacitor in the electric energy recovery mode will be described as follows.

FIG. 6 illustrates an example in which balancing is performed at low speed when the electric energy stored in the third battery cell CELL3 is the highest among the electric energies stored in the first to fourth battery cells CELL1 to CELL4 provided in the battery cell module 410 and the series resonant circuit 420 includes the variable capacitor unit Cv implemented with the first and second capacitors C1 and C2 and the 22nd switch SW22. At this time, since the 22nd switch SW22 is turned off, the capacity of the capacitor unit Cv is set by the first capacitor C1.

In this case, according to a switching control signal outputted from the control unit (not illustrated), the third switch SW3 among the switches of the first switch unit 431 is turned on, and the other switches are turned off. The ninth switch SW9 among the switches of the second switch unit 432 is turned on, and the other switches are turned off. The 11th and 12th switches SW11 and S12 among the switches of the third switch unit 433 are turned on, and the other switches are turned off.

Thus, the electric energy stored in the third battery cell CELL3 of the battery cell module 410 is temporarily stored into the first capacitor C1 of the series resonant circuit 420 through the third switch SW3 of the first switch unit 431, the first node N1, and the 11th switch SW11 of the third switch unit 433. At this time, the capacity of the capacitor unit Cv is set to be lower than when the first and second capacitors C1 and C2 are connected in parallel to each other. Thus, since the balancing operation for the battery cell module 410 is performed at low speed, the balancing efficiency is improved.

However, when the balancing speed is intended to be increased under the condition of FIG. 6, the switching control signal is used to turn on the 22nd switch SW22 as illustrated in FIG. 7. Thus, the first and second capacitors C1 and C2 are connected in parallel to each other, and the capacity of the capacitor unit Cv is adjusted (increased).

Thus, a balancing operation is performed in such a manner that the electric energy stored in the third battery cell CELL3 is temporarily stored into the first and second capacitors C1 and C2 connected in parallel to each other in the series resonant circuit 420 through the above-described path, in a state where the switches of the first to third switch units 431 to 433 are switched in the same manner as illustrated in FIG. 6. However, since the first and second capacitors C1 and C2 are connected in parallel to each other, the capacitance of the capacitor unit Cv increases more than in FIG. 6. Therefore, the balancing speed is increased to secure the cell stability.

Through the above-described series of processes, the electric energy temporarily stored in the capacitor unit Cv of the series resonant circuit 420 is supplied to a battery cell having the lowest electric energy among the first to fourth battery cells CELL1 to CELL4, for example, the fourth battery cell CELL4 in the electric energy supply mode.

At this time, the fifth switch SW5 of the first switch unit 431, the ninth switch SW9 of the second switch unit 432, and the 13th and 14th switches SW13 and S14 of the third switch unit 433 are turned on, and the other switches are turned off. Thus, the electric energy temporarily stored in the capacitor unit Cv is supplied to the fourth battery cell CELL4 through the 14th switch SW14 and the ninth switch SW9.

Even at this time, as the capacity of the capacitor unit Cv is varied by connecting the first and second capacitors C1 and C2 in parallel to each other or separating the first and second capacitors C1 and C2 from each other through the 22nd switch SW22 as illustrated in FIGS. 6 and 7, the balancing speed may be adjusted.

Figure 8:
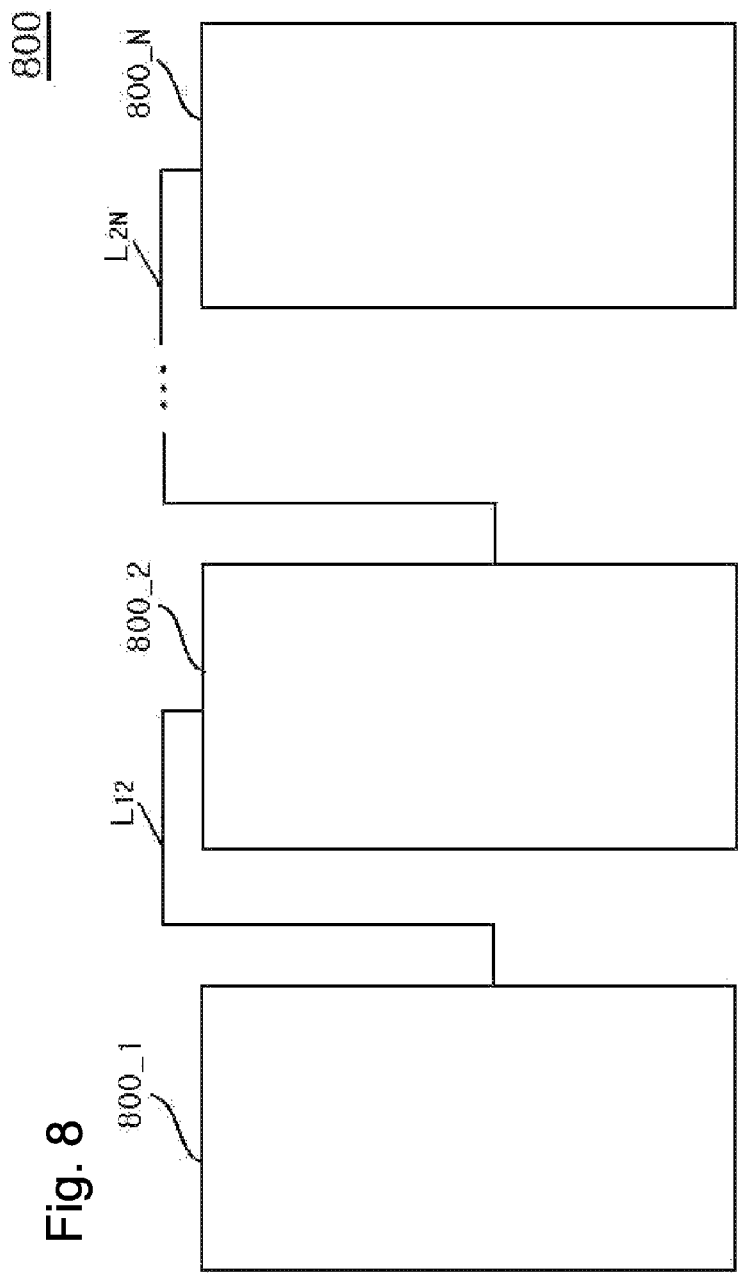
FIG. 8 is a block diagram of a battery cell balancing circuit using an LC series resonant circuit according to another embodiment of the present invention.
Figure 9A:
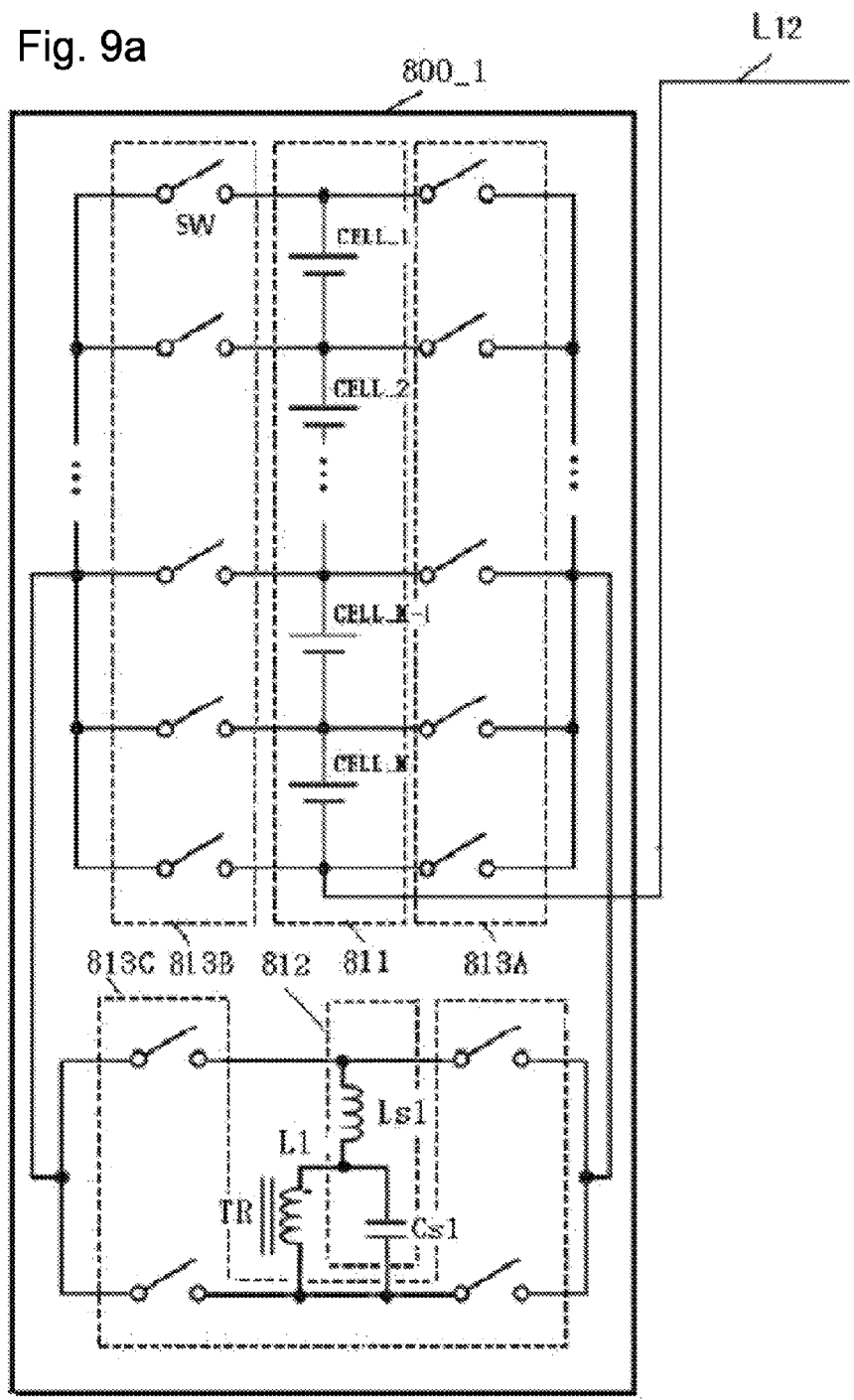

FIG. 8 is a block diagram of a battery cell balancing circuit using an LC series resonant circuit according to another embodiment of the present invention. FIGS. 9A to 9C are detailed circuit diagrams of battery modules of FIG. 8. The battery cell balancing circuit includes N battery modules 800_1 to 800_N. Since each of the N battery modules 800_1 to 800_N includes M battery cells CELL_1 to CELL_M, the battery cell balancing circuit 800 includes M*N battery cells. The M battery cells CELL_1 to CELL_M provided in each of the N battery modules 800_1 to 800_N are connected in series.

When a battery cell of an arbitrary battery module among the N battery modules 800_1 to 800_N, for example, one battery cell among battery cells CELL_1 to CELL_M of a first battery cell module 811 of the first battery module 800_1 is charged with higher electric energy than the other battery cells, the electric energy of the battery cell is temporarily stored into a capacitor Cs1 of a series resonant circuit 812 through an electric energy recovery path formed through switches of first to third switch units 813A to 813C.

Each of the N battery modules 800_1 to 800_N includes a capacitor Cs1 connected in parallel to a coil L1 of a transformer TR. The coils L1 are magnetically coupled to each other. Thus, when electric energy is recovered through the above-described path in an arbitrary battery module and temporarily stored in the capacitor Cs1, the electric energy is transmitted to the capacitors Cs1 of the other battery modules through the coils L1. Therefore, the capacitors Cs1 of all of the battery modules 800_1 to 800_N are charged with the electric energy at the same level.

As the transformers TR are used to share the charge voltages of the capacitors Cs1 of the battery modules 800_1 and 800_N, the electric energy may be easily transmitted between the battery cells even though switches having a low internal voltage are used.

The electric energy temporarily-stored in the capacitor Cs1 of the series resonant circuit 812 is supplied to a battery cell charged with lower electric energy than the other battery cells in an arbitrary battery module among the N battery modules 800_1 to 800_N through the electric energy supply path formed by the switches of the first to third switches 813A to 813C.

Through the above-described series of electric energy recovery and supply processes, battery cell balancing is performed.

In FIGS. 9A to 9C, SPST (single pole single throw) switches was used as the switches provided in the first to third switch units 813A to 813C. However, the present invention is not limited thereto, and the first to third switch units 431 to 433 may be implemented with other switching elements such as MOSFET (metal oxide field effect transistor), BJT (bipolar junction transistor), and IGBT (insulated gate bipolar transistor).

Figure 10:
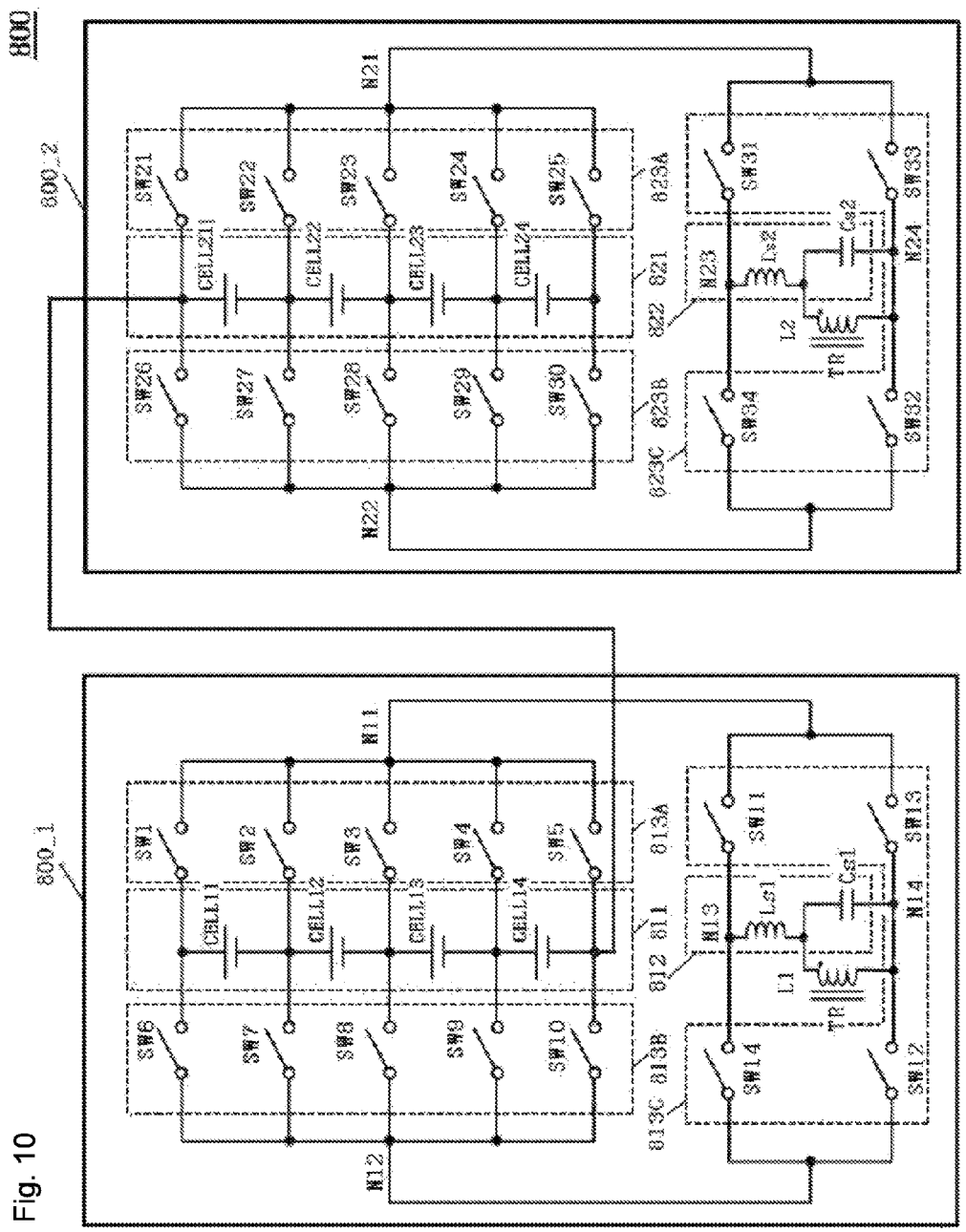
FIG. 10 illustrates that the battery cell balancing circuit using an LC series resonant circuit according to the embodiment of the present invention includes two battery modules.

FIG. 10 illustrates that the battery cell balancing circuit using an LC series resonant circuit according to the embodiment of the present invention includes two battery modules. Referring to FIG. 10, the battery cell balancing operation according to the embodiment of the present invention will be described in more detail as follows.

Referring to FIG. 10, the battery cell balancing circuit 800 includes the first and second battery modules 800_1 and 800_2. Since the first and second battery modules 800_1 and 800_2 have the same structure, the following descriptions will be focused on the first battery module 800_1 between the first and second battery modules 800_1 and 800_2.

The first battery module 800_1 includes a first battery cell module 811, a series resonant circuit 812, a switch unit including first to third switch units 813A to 813C, and a first coil L1 of a transformer TR.

The first battery cell module 811 includes first to fourth battery cells CELL11 to CELL14 connected in series.

The series resonant circuit 812 includes a first inductor Ls1 and a first capacitor Cs1 connected in series.

The first coil L1 of the transformer TR is connected in parallel to the first capacitor Cs1.

The first switch unit 813A forms a path for recovering or supplying electric energy from or to the first to fourth battery cells CELL11 to CELL14. For this operation, the first switch 813A includes first to fifth switches SW1 to SW5 of which one terminals are connected to the respective terminals of the first to fourth battery cells CELL11 to CELL14 and the other terminals are commonly connected to a first common node N11.

The second switch unit 813B forms a path for recovering or supplying electric energy from or to the first to fourth battery cells CELL11 to CELL14. For this operation, the second switch 813B includes sixth to tenth switches SW6 to SW10 of which one terminals are connected to the respective terminals of the first to fourth battery cells CELL11 to CELL14 and the other terminals are commonly connected to a second common node N12.

The respective terminals of the first to fourth battery cells CELL1 to CELL14 include one terminal of the first battery cell CELL11, a common connection terminal between the other terminal of the first battery cell CELL11 and one terminal of the second battery cell CELL12, a common connection terminal between the other terminal of the second battery cell CELL12 and one terminal of the third battery cell CELL13, a common connection terminal between the other terminal of the third battery cell CELL13 and one terminal of the fourth battery cell CELL14, and the other terminal of the fourth battery cell CELL14.

The third switch unit 813C includes 11th to 14th switches SW11 to SW14. The 11th switch SW11 is configured to connect one end terminal of the series resonant circuit 812 to the first common node N11, and the 12th switch SW12 is configured to connect the other end terminal of the series resonant circuit 812 to the second common node N12, in the electric energy recovery mode. The 13th switch SW13 is configured to connect the other end terminal of the series resonant circuit 812 to the first common node N11, and the 14th switch SW14 is configured to connect the one end terminal of the series resonant circuit 812 to the second common node N12.

The first to fourth battery cells CELL11 to CELL14 connected in series to the first battery cell module 811 of the first battery module 800_1 are connected in series to the first to fourth battery cells CELL21 to CELL24 connected in series to the second battery cell module 821 of the second battery cell module 800_2.

The first coil L1 of the transformer TR connected in parallel to the first capacitor Cs1 of the first battery module 800_1 and the second coil L2 of the transformer TR connected in parallel to the second capacitor Cs2 of the second battery module 800_2 are magnetically coupled to each other.

Among electric energies stored in the first to fourth battery cells CELL11 to CELL14 provided in the first battery cell module 811 of the first battery module 800_1 and electric energies stored in the first to fourth battery cells CELL21 to CELL24 provided in the second battery cell module 821 of the second battery module 800_2, the highest electric energy is temporarily stored into the first capacitor Cs1 of the series resonant circuit 812 of the first battery module 800_1 or the second capacitor Cs2 of the series resonant circuit 822 of the second battery module 800_2 through the electric energy recovery path formed by corresponding switches of the switch units.

Figure 11:
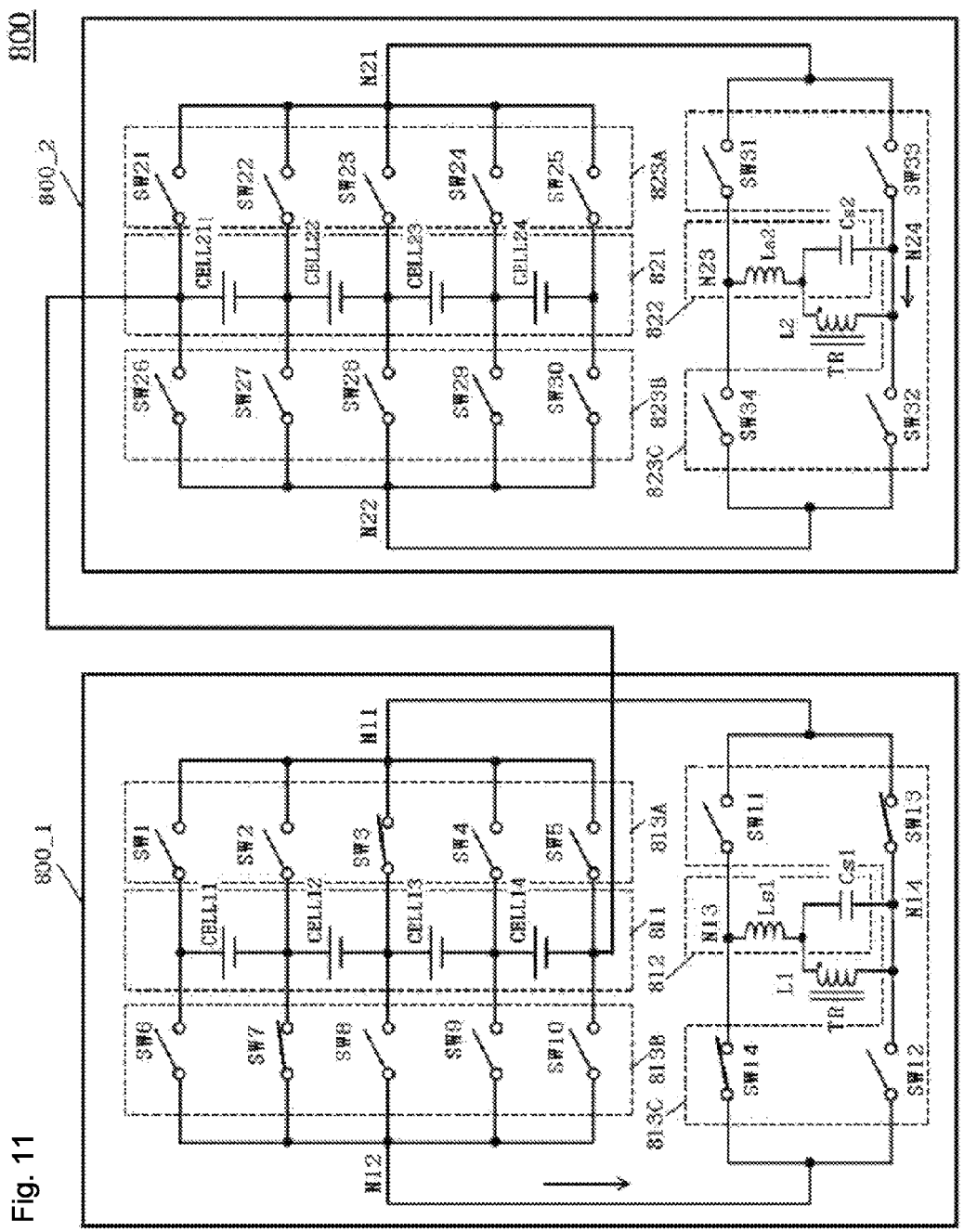
FIG. 11 is a circuit diagram of the battery cell balancing circuit to perform an electric energy recovery mode.

Referring to FIG. 11, the electric energy recovery mode will be described as follows. In FIG. 11, suppose that among the electric energies stored in the first to fourth battery cells CELL11 to CELL14 provided in the first battery cell module 811 of the first battery module 800_1 and the electric energies stored in the first to fourth battery cells CELL21 and CELL24 provided in the second battery cell module 821 of the second battery module 800_2, the highest electric energy is stored in the second battery cell CELL12 of the first battery cell module 811.

In this case, according to the switching control signal outputted from the control unit (not illustrated), the third switch SW3 among the switches of the first switch unit 813A of the first battery module 800_1 is turned on, and the other switches are turned off. The seventh switch SW7 among the switches of the second switch unit 813B is turned on, and the other switches are turned off. The 13th and 14th switches SW13 and SW14 among the switches of the third switch unit 813C are turned on, and the other switches are turned off. At this time, all of the switches of the first to third switch units 823A to 823C in the second battery module 800_2 are turned off.

Thus, the electric energy stored in the second battery cell CELL12 provided in the first battery cell module 811 of the first battery module 800_1 is temporarily stored into the first capacitor Cs1 of the series resonant circuit 812 through the seventh switch SW7 of the second switch unit 813B, the second node N12, and the 14th switch SW14 of the third switch unit 813C.

At this time, since the capacity of the second battery cell CELL12 is much larger than the capacity of the first capacitor Cs1, the charge voltage of the second battery cell CELL12 slightly decreases when the series resonant circuit 812 resonates in the electric energy recovery mode. On the other hand, the charge voltage of the first capacitor Cs1 increases in the form of a sine function.

As described above, however, the first and second coils L1 and L2 of the transformers TR are magnetically coupled to each other. Thus, the electric energy stored in the first capacitor Cs1 is stored into the second capacitor Cs2 through the first and second coils L1 and L2 of the transformer TR. Then, the first and second capacitors Cs1 and Cs2 are charged with electric energies at the same level in the electric energy recovery mode.

Figure 12:
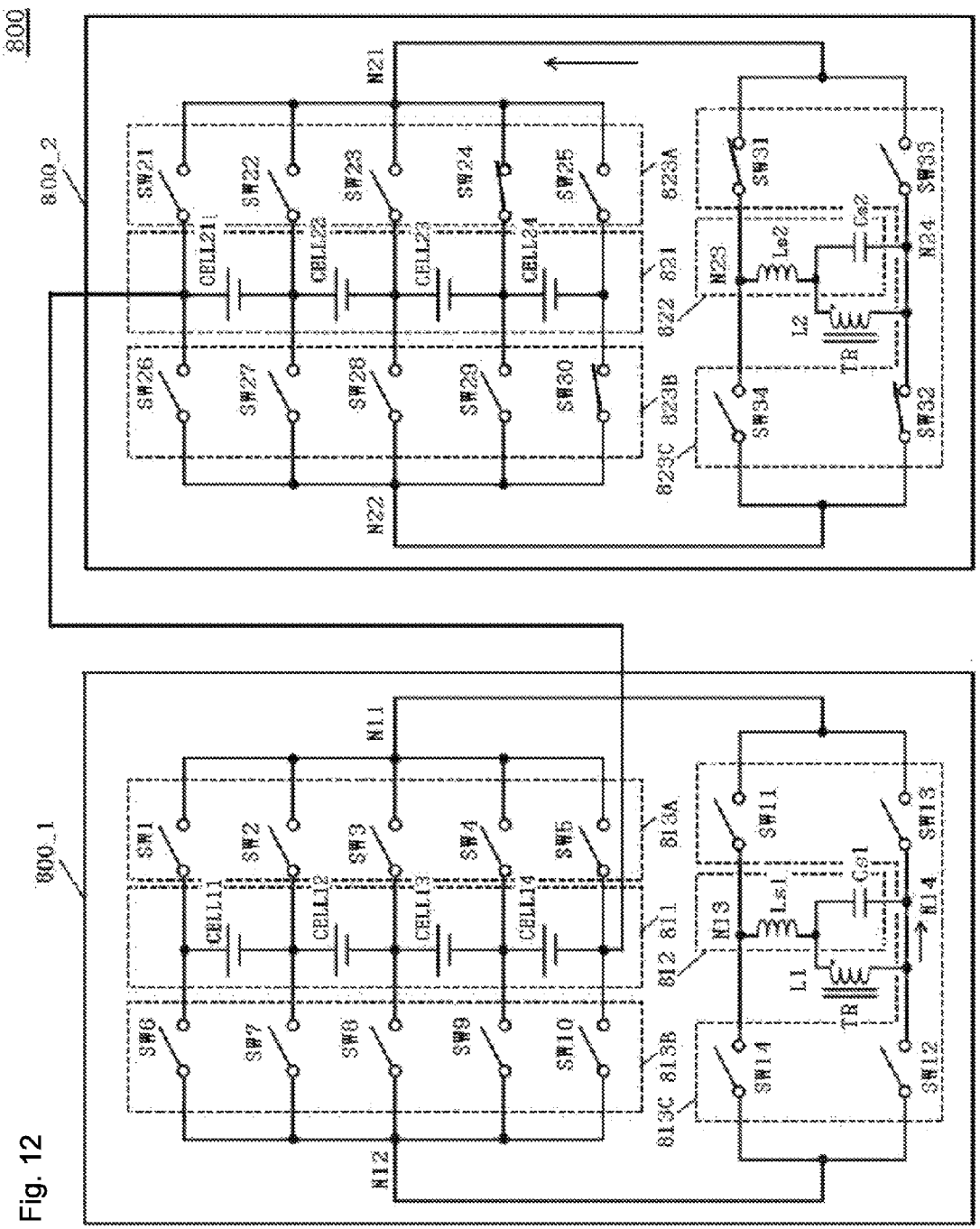
FIG. 12 is a circuit diagram of the battery cell balancing circuit to perform an electric energy supply mode.

The electric energy supply mode in which the recovered electric energy is supplied to a battery cell having lower electric energy than the other battery cells will be described with reference to FIG. 12. In FIG. 12, suppose that among the electric energies stored in the first to fourth battery cells CELL11 to CELL14 provided in the first battery cell module 811 of the first battery module 800_1 and the electric energies stored in the first to fourth battery cells CELL21 to CELL24 provided in the second battery cell module 821 of the second battery module 800_2, the lowest electric energy is stored in the fourth battery cell CELL24 of the second battery cell module 821.

In this case, according to the switching control signal outputted from the control unit, all of the switches of the first to third switch units 813A to 813C of the first battery module 800_1 are turned off. At this time, the 24th switch among the switches of the first switch unit 823A of the second battery module 800_2 is turned on, and the other switches are turned off. The 30th switch SW30 among the switches of the second switch unit 823B is turned on, and the other switches are turned off. The 31st and 32nd switches SW31 and SW32 among the switches of the third switch unit 823C are turned on, and the other switches are turned off.

Thus, the electric energy stored in the second capacitor Cs2 of the second battery module 800_2 is supplied to the fourth battery cell CELL24 of the second battery cell module 821 through the 31st switch SW31 of the third switch unit 823 and the 24th switch SW24 of the first switch unit 823A.

At this time, since the capacity of the fourth battery cell CELL24 is much larger than the capacity of the second capacitor Cs2, the charge voltage of the fourth battery cell CELL24 slightly increases in the electric energy supply mode. On the other hand, the charge voltage of the second capacitor Cs2 decreases in the form of a sine function.

As described above, however, the first and second coils L1 and L2 of the transformer TR are magnetically coupled to each other. Thus, the electric energies of the first and second capacitors Cs1 and Cs2 decease to the same level in the electric energy supply mode.

When the voltage is supplied to the first and second coils L1 and L2 of the transformers TR only in one direction in the electric energy recovery mode and the electric energy supply mode, saturation may occur. In order to prevent the saturation, a bipolar voltage may be supplied to the first and second coils L1 and L2 of the transformers TR such that an average voltage becomes 0.

Figure 13:
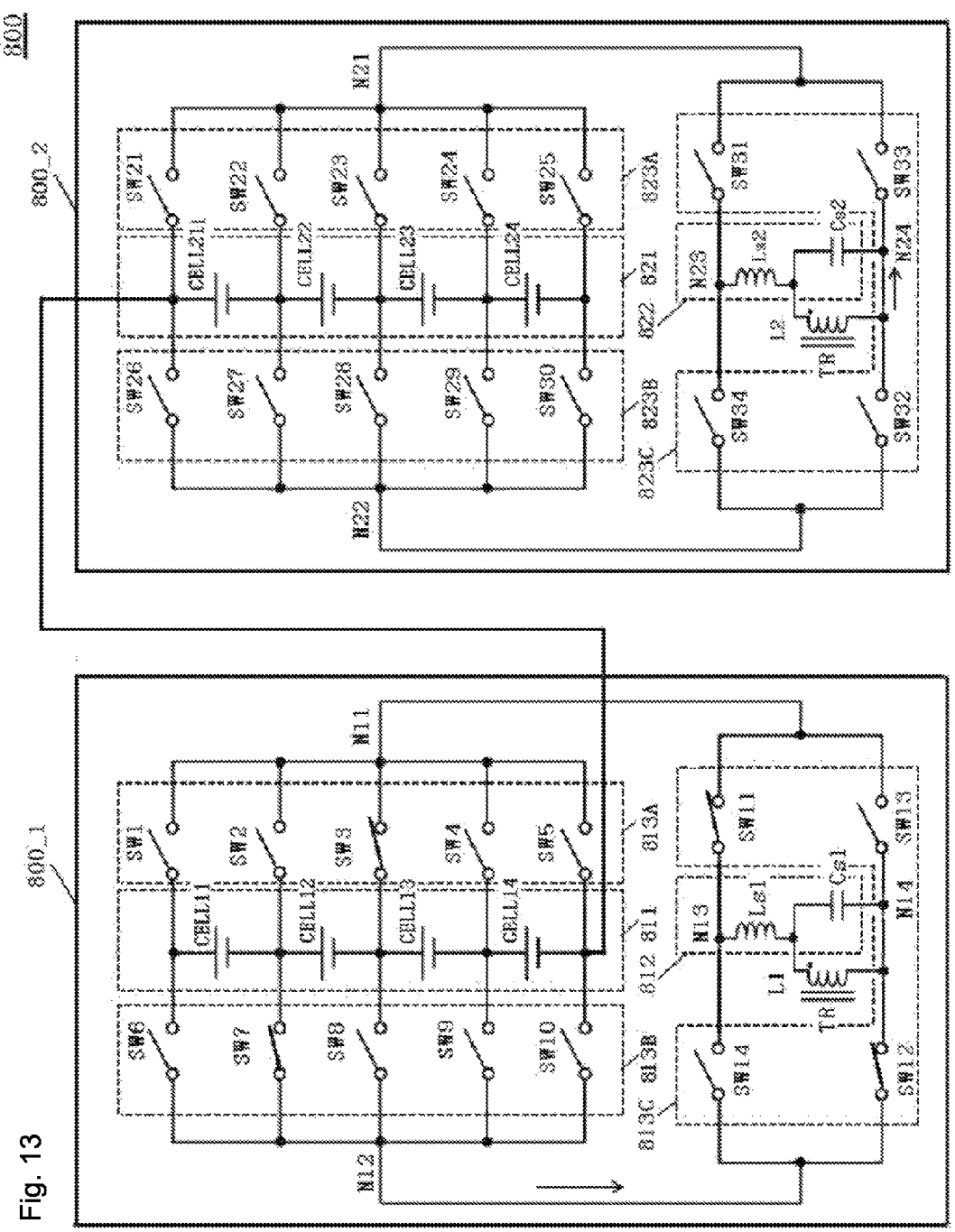
FIG. 13 is another circuit diagram of the battery cell balancing circuit to perform an electric energy recovery mode.
Figure 14:
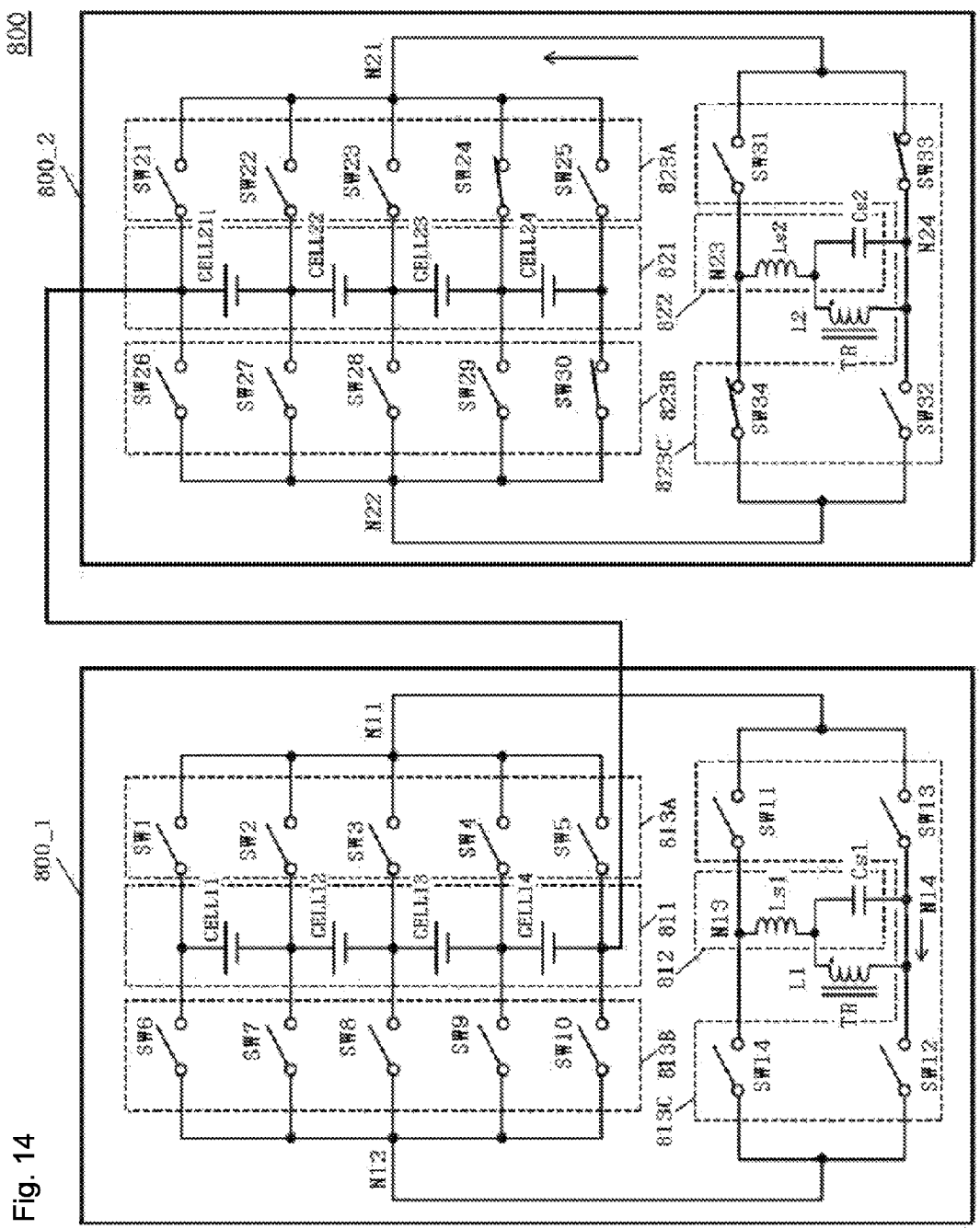
FIG. 14 is another circuit diagram of the battery cell balancing circuit to perform an electric energy supply mode.

FIGS. 13 and 14 illustrate embodiments for preventing the saturation.

FIG. 13 is different from FIG. 11 in that among the 11th to 14th switches SW11 to SW14 of the third switch unit 813C of the first battery module 800_1, the 11th and 12th switches SW11 and SW12 are turned on and the 13th and 14th switches SW13 and SW14 are turned off in the electric energy recovery mode.

FIG. 14 is different from FIG. 12 in that among the 31st to 34th switches SW31 and SW34 of the third switch unit 823C of the second battery module 800_2, the 33rd and 34th switches SW33 and SW34 are turned on and the 31st and 32nd switches SW31 and SW32 are turned off in the electric energy supply mode.

In other words, in the electric energy recovery mode, the electric energy recovery path of FIG. 11 and the electric energy recovery path of FIG. 13 are alternately provided to recover electric energy from the corresponding battery cell, until the electric energy balancing is achieved among the first to fourth battery cells CELL11 to CELL14 provided in the first battery cell module 811 and the first to fourth battery cells CELL21 to CELL24 provided in the second battery cell module 821 of the second battery module 800_2. Furthermore, in the electric energy supply mode, the electric energy supply path of FIG. 12 and the electric energy supply path of FIG. 14 are alternately provided to supply electric energy to the corresponding battery cell, until the electric energy balancing is achieved among the first to fourth battery cells CELL11 to CELL14 provided in the first battery cell module 811 and the first to fourth battery cells CELL21 to CELL24 provided in the second battery cell module 821 of the second battery module 800_2. Then, when the balancing operation for the battery cells is performed, it is possible to prevent the saturation of the transformer TR.

When the balancing operation for the battery cells is performed, it is possible distinguish a battery cell having the highest electric energy and a battery cell having the lowest electric energy using information on the states of charge and the states of performance of the battery cells, which is provided from a balancing algorithm of a battery management system (not illustrated).

In the above embodiments, it has been described that the electric energy is recovered from the battery cell having the highest electric energy, and the recovered electric energy is supplied to the battery cell having the lowest electric energy. However, the present invention is not limited thereto. For example, based on the above-described battery cell balancing principle, electric energy may be recovered from a plurality of battery cells charged with higher electric energy than the other battery cells, and the recovered electric energy may be supplied to a plurality of battery cells charged with lower electric energy than the other battery cells.

Figure 15:
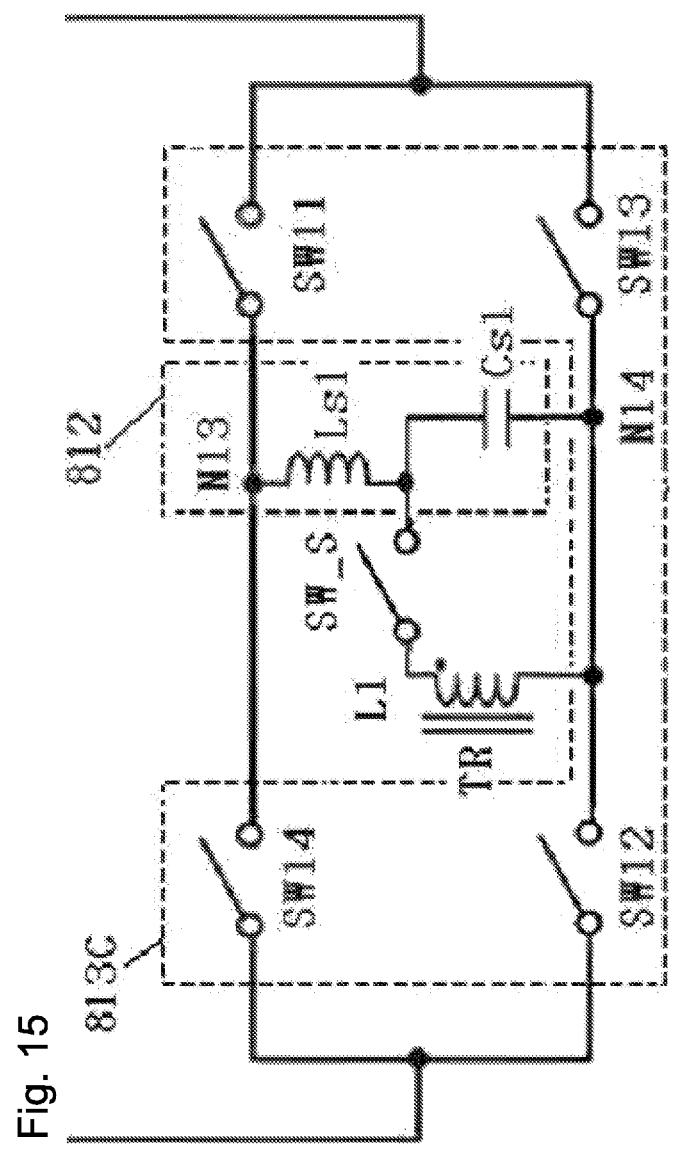
FIG. 15 is a circuit diagram illustrating an example in which transforms are selectively driven.

FIG. 15 illustrates another embodiment of the present invention. For example, a select switch SW_S is connected between one end terminal of the first coil L1 of the transformer TR and one terminal of the first capacitor Cs1 in FIG. 10 such that the first coil L1 is selectively connected in parallel to the first capacitor Cs1.

The select switch SW_S is turned off when electric energy does not need to be transmitted between the battery modules and a separate electric energy balancing operation is performed within the first battery module 800_1. However, the select switch SW_S is turned on, when the electric energy needs to be exchanged between the battery modules 800_1 and 800_2 after the separate electric energy balancing operation is performed.

According to the embodiments of the present invention, the battery cell balancing circuit performs a balancing operation on the battery cell module using the switching elements and the series resonant circuit, which makes it possible to reduce the size of a product and the price of the battery cell balancing circuit.

Furthermore, when the balancing function is performed on the plurality of battery cells, the balancing function is performed through switches having a low internal voltage, which makes it possible to guarantee a stable balancing operation.

Furthermore, when a balancing operation is performed on the battery cell module having a plurality of battery cells connected in series, the balancing operation is performed at low speed at normal times, which makes it possible to improve the balancing efficiency. When high-speed balancing is required, the value of the capacitor or the inductor may be adjusted to improve the balancing speed.

Furthermore, when the balancing function is performed on the plurality of battery cells and the plurality of battery cell modules provided in the plurality of battery modules are connected in series, the transformers may be used to vary the electric energies of the capacitors of the respective battery cell module at the same level. Thus, the cell balancing between the respective battery modules may be effectively performed.

Furthermore, when the balancing function is performed on the plurality of battery cells, battery cells may be freely selected as balancing targets. Thus, the balancing operation from a battery cell having the highest electric energy to a battery cell having the lowest electric energy may be efficiently performed.

Furthermore, when the balancing function is performed on the plurality of battery cells, electric energy is transmitted through the LC series resonant circuit. Thus, an energy loss caused by switching and a heating value may be reduced.

Although a preferred embodiment of the present invention has been described for illustrative purposes, those skilled in the art will appreciate that various modifications, additions and substitutions are possible, without departing from the scope and the spirit of the invention as disclosed in the accompanying claims.

What is claimed is:

1. A battery cell balancing circuit comprising:
    a battery cell module comprising a plurality of battery cells connected in series;
    a series resonant circuit comprising an inductor unit and a capacitor unit which are connected in series so as to store electric energy recovered from a corresponding battery cell of the battery cell module and supply the stored electric energy to a corresponding battery cell of the battery cell module; and
    a switch unit configured to provide an electric energy recovery path for storing the electric energy recovered from the corresponding battery cell of the battery cell module into the capacitor unit of the series resonant circuit and provide an electric energy supply path for supplying the stored electric energy to the corresponding battery cell of the battery cell module.

2. The battery cell balancing circuit of claim 1, wherein one or more of the inductor unit and the capacitor unit have a variable capacity.

3. The battery cell balancing circuit of claim 1, wherein the inductor unit comprises:
    a plurality of inductors; and
    one or more switches configured to connect an arbitrary number of inductors in parallel to each other among the plurality of inductors.

4. The battery cell balancing circuit of claim 1, wherein the inductor unit comprises:
    a first inductor;
    a second inductor; and
    a 21st switch configured to perform a switching operation such that the first and second inductors are connected in parallel to each other or separated from each other.

5. The battery cell balancing circuit of claim 1, wherein the capacitor unit comprises:
    a plurality of capacitors; and
    one or more switches configured to connect an arbitrary number of capacitors in parallel to each other among the plurality of capacitors.

6. The battery cell balancing circuit of claim 1, wherein the capacitor unit comprises:
   a first capacitor;
   a second capacitor; and
   a 22nd switch configured to perform a switching operation such that the first and second capacitors are connected in parallel to each other or separated from each other.

7. The battery cell balancing circuit of claim 1, wherein the switch unit comprises:
   a first switch unit comprising a plurality of switches connected between a first common node and one terminals of the plurality of battery cells, respectively;
   a second switch unit comprising a plurality of switches connected between a second common node and the other terminals of the plurality of battery cells, respectively; and
   a third switch unit comprising switches connected between the first common node and both terminals of the series resonant circuit and switches connected between the second common node and both terminals of the series resonant circuit.

8. The battery cell balancing circuit of claim 7, wherein the respective switches of the first to third switch units comprise one or more of an SPST (single pole single throw) switch and a MOS transistor.

9. The battery cell balancing circuit of claim 1, wherein the electric energy recovered from the corresponding battery cell of the battery cell module comprises electric energy recovered from a battery cell storing the highest electric energy among the battery cells of the battery cell module.

10. The battery cell balancing circuit of claim 1, wherein the battery cell receiving the stored electric energy comprises a battery cell storing the lowest electric energy among the battery cells of the battery cell module.

11. A battery cell balancing circuit using an LC series resonant circuit, comprising a plurality of battery modules, wherein each of the battery modules comprises:
   a battery cell module comprising a plurality of battery cells connected in series;
   a series resonant circuit configured to store electric energy recovered from a corresponding battery cell of the battery cell module and supply the stored electric energy to a corresponding battery cell of the battery cell module;
   a switch unit configured to provide an electric energy recovery path for storing the electric energy recovered from the corresponding battery cell of the battery cell module into a capacitor of the series resonant circuit and provide an electric energy supply path for supplying the stored electric energy to a corresponding battery cell of the battery cell module; and
   a coil of a transformer connected in parallel to the capacitor,
   the battery cell modules are connected in series, and
   the coils included in the series resonant circuits are magnetically coupled so that the levels of electric energies stored in or discharged from the capacitors are varied at the same level.

12. The battery cell balancing circuit of claim 11, wherein the switch unit comprises:
   a first switch unit comprising a plurality of switches connected between a first common node and one terminals of the plurality of battery cells, respectively;
   a second switch unit comprising a plurality of switches connected between a second common node and the other terminals of the plurality of battery cells, respectively; and
   a third switch unit comprising a plurality of switches connected between the first common node and both terminals of the series resonant circuit and a plurality of switches connected between the second common node and both terminals of the series resonant circuit.

13. The battery cell balancing circuit of claim 12, wherein the respective switches of the first to third switch units comprise one or more of an SPST switch and a MOS transistor.

14. The battery cell balancing circuit of claim 11, wherein the switch unit forms a path for alternately supplying a voltage to the coil of the transformer in both directions, when the electric energy recovered from the corresponding battery cell of the battery cell module is stored and the stored electric energy is supplied to the corresponding battery cell of the battery cell module.

15. The battery cell balancing circuit of claim 11, wherein the coil of the transformer is separated from the capacitor when a separate electric energy balancing operation is performed in the corresponding battery module and connected to the capacitor when electric energy exchange is required between the battery modules after the separate electric energy balancing operation, through a select switch.

16. The battery cell balancing circuit of claim 11, wherein each of the battery cells has a larger capacity by a predetermined value than the capacitor.

17. The battery cell balancing circuit of claim 11, wherein the electric energy recovered from the corresponding battery cell of the battery cell module comprises electric energy recovered from a battery cell storing the highest electric energy among the battery cells of the battery cell module.

18. The battery cell balancing circuit of claim 11, wherein the battery cell receiving the stored electric energy comprises a battery cell storing the lowest electric energy among the battery cells of the battery cell module.

* * * * *